United States Patent
Laurent et al.

(10) Patent No.: US 11,624,623 B2
(45) Date of Patent: Apr. 11, 2023

(54) PASSENGER RIDE EXTENSION FOR SPECIAL SERVICES USING REMOTE OPERATION

(71) Applicants: Nissan North America, Inc., Franklin, TN (US); Renault S.A.S., Boulogne-Billancourt (FR)

(72) Inventors: Aude Laurent, Redwood City, CA (US); Armelle Guerin, Woodside, CA (US); Erik Vinkhuyzen, Morgan Hill, CA (US); Simon Tien, Santa Clara, CA (US); Kevin Poulet, Menlo Park, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 964 days.

(21) Appl. No.: 16/420,445

(22) Filed: May 23, 2019

(65) Prior Publication Data
US 2020/0370899 A1 Nov. 26, 2020

(51) Int. Cl.
*G01C 21/34* (2006.01)
*G08G 1/00* (2006.01)

(52) U.S. Cl.
CPC ........ *G01C 21/3438* (2013.01); *G08G 1/202* (2013.01)

(58) Field of Classification Search
CPC .............. G01C 21/3438; G08G 1/202; G06Q 10/047; G06Q 50/30
See application file for complete search history.

(56) References Cited

U.S. PATENT DOCUMENTS

| | | | |
|---|---|---|---|
| 2016/0307289 A1* | 10/2016 | Choksi | G06Q 50/30 |
| 2020/0193368 A1* | 6/2020 | Bhatia | B60R 25/25 |

\* cited by examiner

*Primary Examiner* — Nadeem Odeh
(74) *Attorney, Agent, or Firm* — Young Basile Hanlon & MacFarlane, P.C.

(57) ABSTRACT

An apparatus for remote support of autonomous operation of a vehicle includes a processor that is configured to perform a method including receiving a request for a trip through a transportation network, wherein the trip includes a first travel portion from a first location to a second location, and a second travel portion from the second location to a third location. Each of the first travel portion and the second travel portion is associated with a different service such that a first payload of the first travel portion is different from a second payload of the second travel portion. The method also includes determining, based on the request, a route for the trip from the first location to the second location, and from the second location to the third location, and performing a validation process that confirms a presence of cargo in the first payload and/or the second payload.

20 Claims, 6 Drawing Sheets

PASSENGER RIDE EXTENSION FOR SPECIAL SERVICES USING REMOTE OPERATION

TECHNICAL FIELD

This application relates to the remote operation of an autonomous vehicle, in particular to providing special services by extending a passenger ride.

BACKGROUND

The use of autonomous vehicles can result in improved vehicle safety and more effective communication between vehicles. Further, increasing autonomous vehicle usage creates the potential for more efficient movement of passengers and cargo through a transportation network.

SUMMARY

Disclosed herein are aspects, features, elements, implementations, and implementations for remote support of autonomous operation of a vehicle. The ability of an autonomous vehicle to transport cargo without a passenger or operator allows for the provision of special services. The teachings herein support a trip that extends the ride of a passenger for such special services, such as the pickup of cargo before the ride or the delivery of cargo after the ride.

An aspect of the disclosed implementations includes an apparatus for remote support of autonomous operation of vehicles. The apparatus includes a processor that performs a method including receiving a request for a trip through a transportation network, wherein the trip includes a first travel portion from a first location to a second location, and a second travel portion from the second location to a third location, and each of the first travel portion and the second travel portion is associated with a different service such that a first payload of the first travel portion is different from a second payload of the second travel portion, determining, based on the request, a route for the trip from the first location to the second location, and from the second location to the third location, and performing a validation process that confirms a presence of cargo in at least one of the first payload or the second payload.

An aspect of the disclosed implementations includes another apparatus for providing remote support of autonomous operation of a vehicle. The apparatus can include a processor that performs a method including receiving a request for a trip through a transportation network, wherein the trip includes a first travel portion from a first location to a second location, and a second travel portion from the second location to a third location, and each of the first travel portion and the second travel portion is associated with a different service such that a first payload of the first travel portion is different from a second payload of the second travel portion, determining, based on the request, a route for the trip from the first location to the second location, and from the second location to the third location, performing a validation process that confirms a presence of an object in at least one of the first payload or the second payload, and notifying a source of the request of the presence of the object.

An aspect of the disclosed implementations includes a method for providing remote support of autonomous operation of a vehicle. The method can include receiving a request for a trip through a transportation network, wherein the trip includes a first travel portion from a first location to a second location, and a second travel portion from the second location to a third location, and each of the first travel portion and the second travel portion is associated with a different service such that a first payload of the first travel portion is different from a second payload of the second travel portion, determining, based on the request, a route for the trip from the first location to the second location, and from the second location to the third location, and performing a validation process that confirms a presence of an object in at least one of the first payload or the second payload.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to-scale. On the contrary, the dimensions of the various features may be arbitrarily expanded or reduced for clarity. Further, like reference numbers refer to like elements throughout the drawings unless otherwise noted.

DETAILED DESCRIPTION

An autonomous vehicle may performing a service such as a taxiing or shuttle operation (e.g., the pick-up and drop-off of a passenger), or a delivery operation (e.g., the pick-up and drop-off of a package). The use of remote support allows the autonomous vehicle to utilize a multi-stage trip where the payload differs for stages of the trip.

To describe some implementations of the teachings herein in greater detail, reference is first made to the environment in which this disclosure may be implemented.

Figure 1:
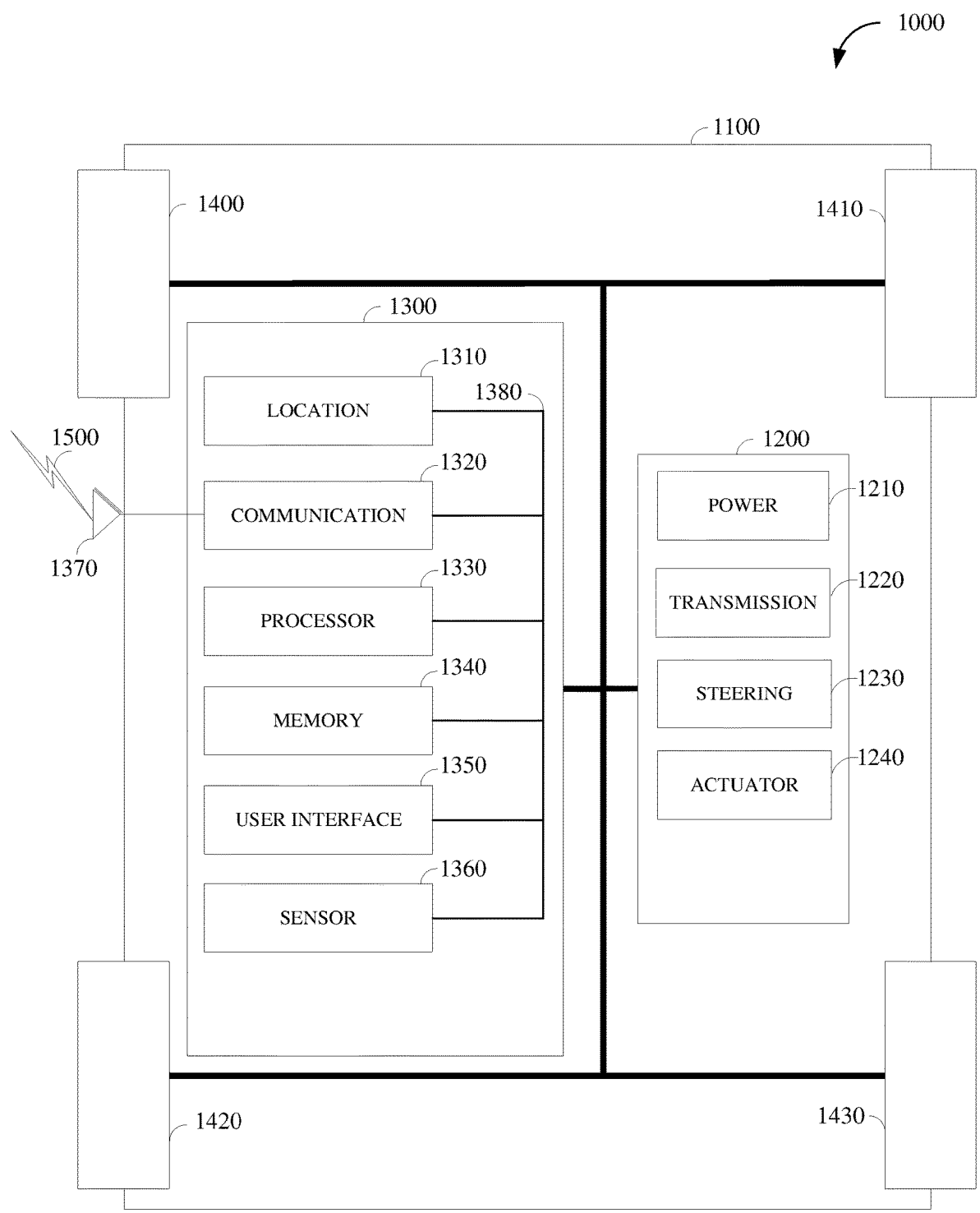
FIG. 1 is a diagram of an example of a portion of a vehicle with which the aspects, features, and elements disclosed herein may be implemented.

FIG. 1 is a diagram of an example of a vehicle 1000 with which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface (UI) 1350, a sensor 1360, and an electronic communication interface 1370. Although shown as a single unit, any one or more elements of the controller 1300 may be integrated into any number of separate physical units. For example, the UI 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the UI 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the UI 1350, the sensor 1360, the powertrain 1200, or any combination thereof. For example, the processor may be operatively coupled with the memory 1340 via a communication bus 1380.

The processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories (ROM), one or more random access memories (RAM), one or more random access memories (RAM), one or more registers, low power double data rate (LPDDR) memories, one or more cache memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The UI 1350 may include any unit capable of being used as an interface by a person, including any of a virtual keypad, a physical keypad, a touchpad, a display, a touchscreen, a speaker, a microphone, a video camera, a sensor, and a printer. The UI 1350 may be operatively coupled with the processor 1330, as shown, or with any other element of the controller 1300. Although shown as a single unit, the UI 1350 can include one or more physical units. For example, the UI 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensor 1360 included, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 includes sensors that are operable to obtain information regarding the physical environment surrounding the vehicle 1000. For example, one or more sensors detect road geometry and obstacles, such as fixed obstacles, vehicles, cyclists, and pedestrians. The sensor 1360 can be or include one or more video cameras, laser-sensing systems, infrared-sensing systems, acoustic-sensing systems, or any other suitable type of on-vehicle environmental sensing device, or combination of devices, now known or later developed. The sensor 1360 and the location unit 1310 may be combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. The optimized trajectory can be control inputs such as a set of steering angles, with each steering angle corresponding to a point in time or a position. The optimized trajectory can be one or more paths, lines, curves, or a combination thereof. That is, for example, the trajectory controller may allow the vehicle 1000 to operate as an autonomous vehicle to traverse a route. Alternatively, the trajectory controller may be implemented in a remote operations center, such as the operations center 2400 described below.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
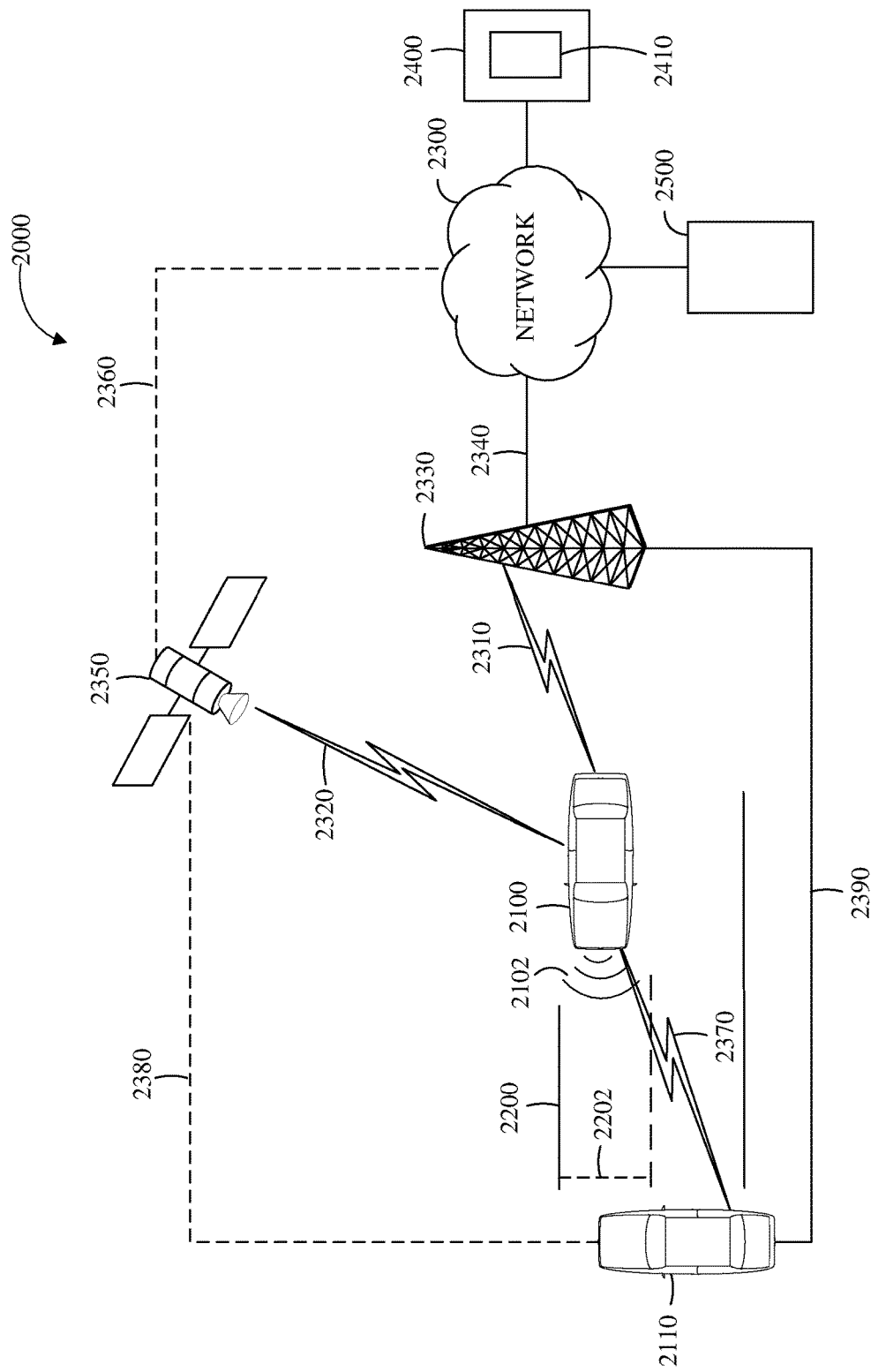
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

The vehicle 2100 may communicate with the electronic communication network 2300 via an access point 2330. The access point 2330, which may include a computing device, is configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350.

The operations center 2400 may include one or more computing devices, which are able to exchange (send or receive) data from vehicles such as the vehicle 2100, external objects including the external object 2110, or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

The external object 2110 is illustrated as a second, remote vehicle in FIG. 2. An external object is not limited to another vehicle. An external object may be any infrastructure element, e.g., a fence, a sign, a building, etc., that has the ability transmit data to the operations center 2400. The data may be, for example, sensor data from the infrastructure element.

Figure 3:
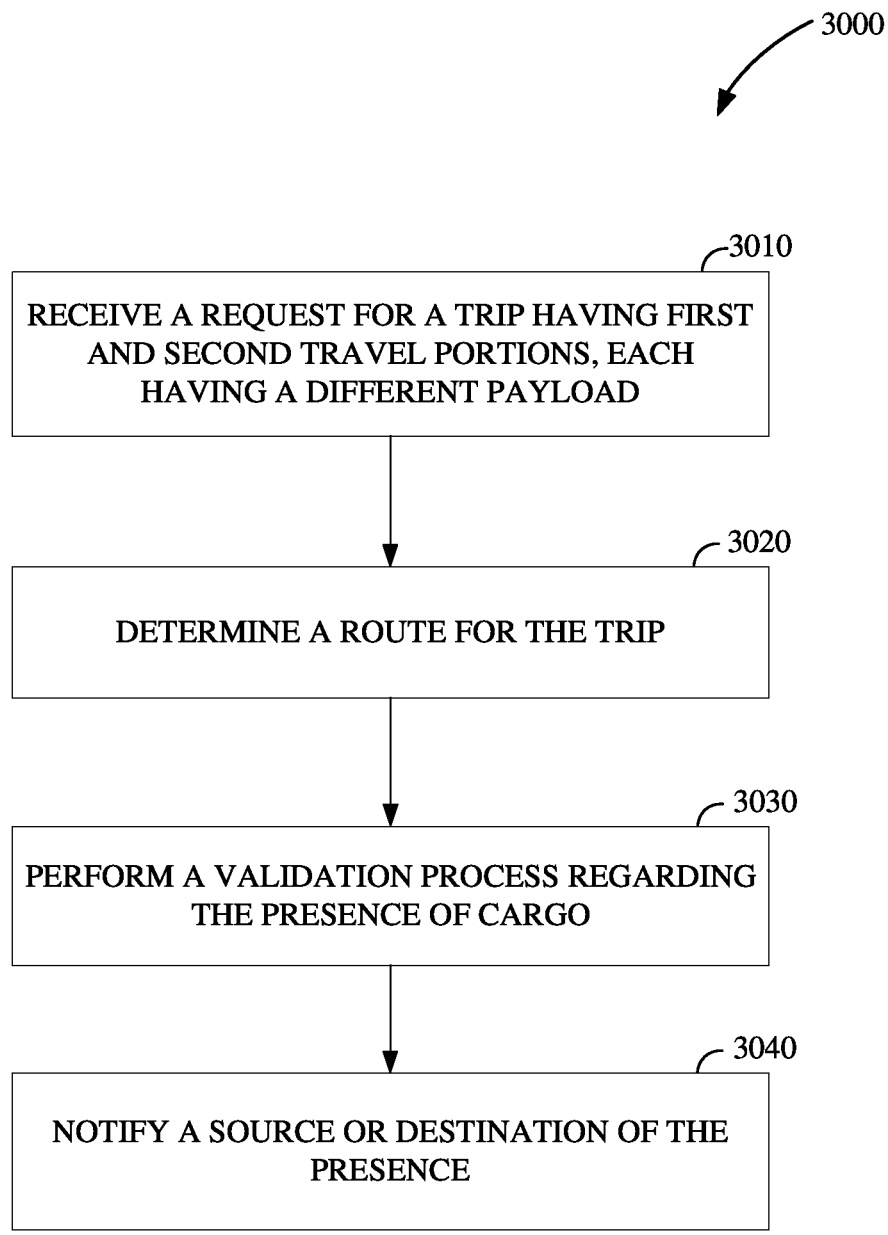
FIG. 3 is a flow chart diagram of a method for remote support of autonomous operation of a vehicle in accordance with the present disclosure.

FIG. 3 is a flow chart diagram of a method 3000 for remote support of autonomous operation of a vehicle in accordance with the present disclosure. The method 3000 may be utilized by a remote support system, such as a fleet manager or a vehicle manager implemented at the operations center 2400. For example, the method 3000 may be implemented by the controller apparatus 2410, such as by the processor, the memory, and the communication device described previously. Some or all aspects of the method 3000 may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the method 3000 can be implemented in a system combining some or all of the features described in this disclosure.

At operation 3010, a request for a trip through a transportation network is received from a source. The trip is to be conducted by a vehicle. The vehicle can include a device or apparatus (e.g. a conveyance) that is used to transport objects including any of one or more passengers and cargo. The vehicle can include a fully-autonomous vehicle or a semi-autonomous vehicle, collectively referred to as an autonomous vehicle herein.

The source may be a mobile device of a customer (e.g., a passenger), such as through an application or a website. Alternatively, or additionally, the source may be an interface of the vehicle, such as the UI 1350. When the vehicle is a service vehicle that is to conduct the trip, the vehicle can receive (e.g., wirelessly) the request. For example, the vehicle 1000 may receive the request via the electronic communication interface 1370 for consideration by the controller 1300. In the examples described herein, the request is received by a communication device for use by the control apparatus 2410 of the operations center 2400, regardless of the source of the request.

The request for the trip through the transportation network, such as the transportation network 2200, may be a single request or multiple requests. If the request for the trip comprises multiple requests, the requests may be made at different times. Additional details of the request are described below in regards to FIGS. 4 and 5. In any event, the trip includes multiple travel portions between locations. For example, the trip may include a first travel portion from a first location to a second location, and a second travel portion from the second location to a third location.

A location may be a street address, a building name, or some other identifier of a location within a geographical area. A location may be a discrete uniquely identifiable geolocation (e.g., a latitude and longitude) identified by or converted into GPS coordinates or map coordinates.

Adjacent travel portions may be associated with different services. In some implementations, at least two adjacent travel portions may be associated with the same service, while other travel portions may be associated with a different services. Each travel portion may be associated with a different service. The service may be a taxiing operation or shuttle operation, such as the pick-up and drop-off of a passenger, or may be a delivery operation, such as the pick-up and drop-off of cargo, such as a package or other cargo, or may be a combinations of these operations. As such, the different services may be associated with different payloads. A payload may include one or more passengers, one or more passengers and cargo, or cargo alone. The cargo may include a package, such as a sealed package, take-away food, a pet, etc. In some implementations, a passenger may be treated as cargo. For example, where a passenger is one for whom extra care is needed at pick-up or drop-off, such as a child, an elderly person, or a disabled person, they may be treated as cargo of a payload during the validation process described below. Different travel portions of the same trip may include the same payload or different payloads. In the example described above with the first travel portion and the second travel portion, each of the first travel portion and the second travel portion is associated with a different service such that a first payload of the first travel portion is different from a second payload of the second travel portion.

At operation 3020, a route is determined for the trip. The route is based on the request. That is, the route may be determined so that it sequentially passes through each of the locations identified by the request. For example, the route may pass from a first location to a second location, from the second location to a third location, from the third location to a fourth location, etc., associated with each of the services. The route may be determined according to any known technique. The route may be used to minimize travel time or minimize travel distance in some examples. As mentioned previously, and as discussed in more detail below, the request may be transmitted in pieces (e.g., the request may be multiple requests including different portions of the trip). Accordingly, the entirety of the trip may not be known before commencement of the trip. As a result, the route may not be determined at one time—it may be determined as location information of the trip becomes available.

Although not shown in FIG. 3, the route may be transmitted to a source of the request, to the vehicle, or both. The route may be transmitted via the communication device of the operations center 2400. When the source is a mobile device of the passenger (e.g., through an application or a website), the passenger may receive the route on the device. When the source is an interface of the vehicle, such as the UI 1350, the passenger may receive the route on the interface. When the vehicle is a service vehicle that is to travel the route, whether or not it is an autonomous vehicle, the vehicle can receive (e.g., wirelessly) and use the route. For example, the vehicle 1000 may receive the route via the electronic communication interface 1370 for use by the controller 1300. The controller 1300 may use the route in a navigation system for the passenger to follow (e.g., when operating semi-autonomously), or may use the route to control the vehicle 1000 (e.g., when operating fully autonomously).

At operation 3030, a validation process that confirms the presence of cargo in a payload is performed. The validation process may be performed at a pick-up location for the cargo, a drop-off location for the cargo, a drop-off location for a passenger, or some combination of these locations as described below with regards to FIGS. 4 and 5.

In some implementations, a source of the request, a source of the cargo, or both (e.g., if they are different) may be notified of the presence of the object at operation 3040. Alternatively or additionally, a destination of the cargo, such as a recipient (i.e., a passenger or other party), may also be notified of the presence of the object at operation 3040. Notification may be achieved by any means, such as via the communication device of the operations center 2400 as described with regards to the transmission of the route above. The notification may be in the form of a telephone call or text message.

Figure 4:
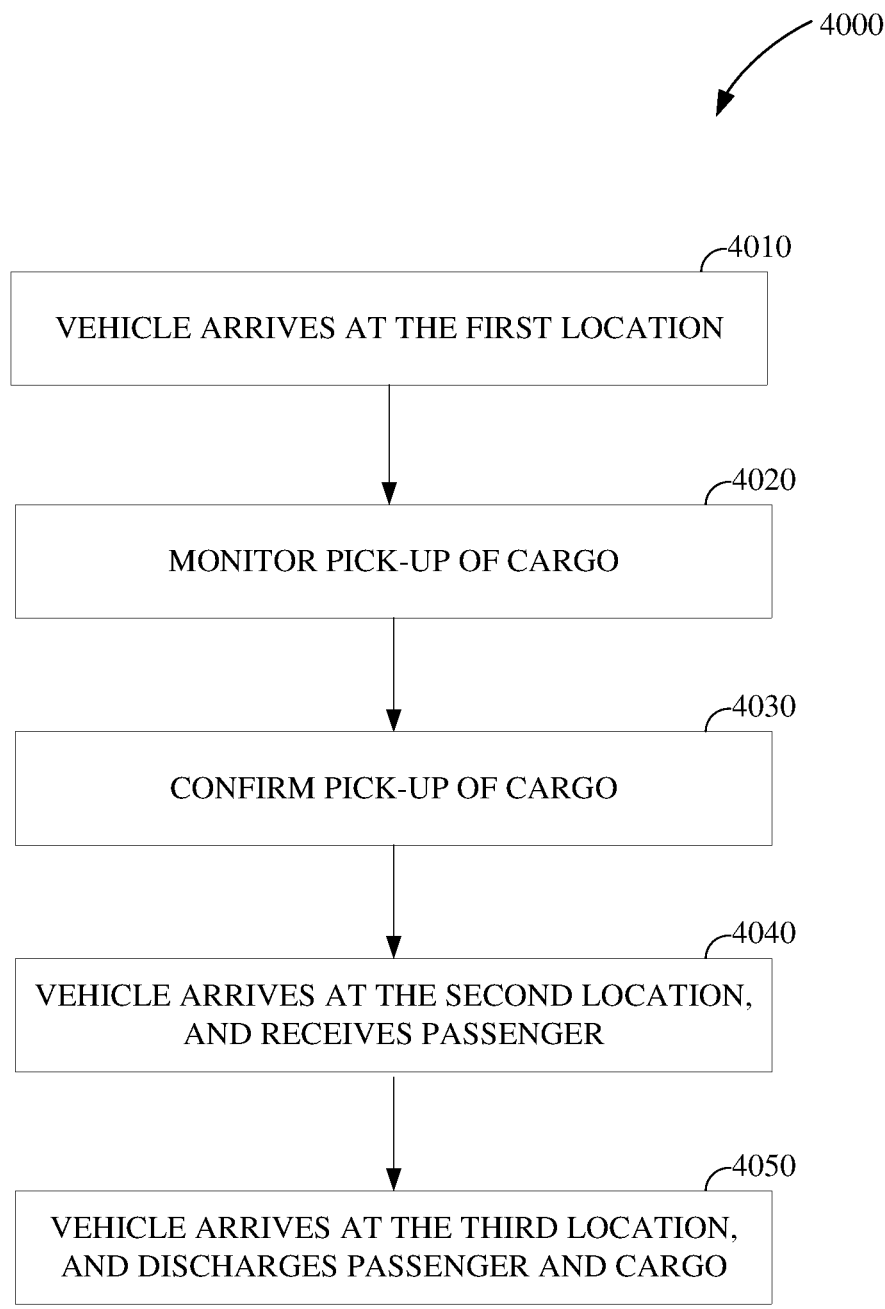
FIG. 4 is a flow chart diagram of a first variation in the method of FIG. 3.
Figure 5:
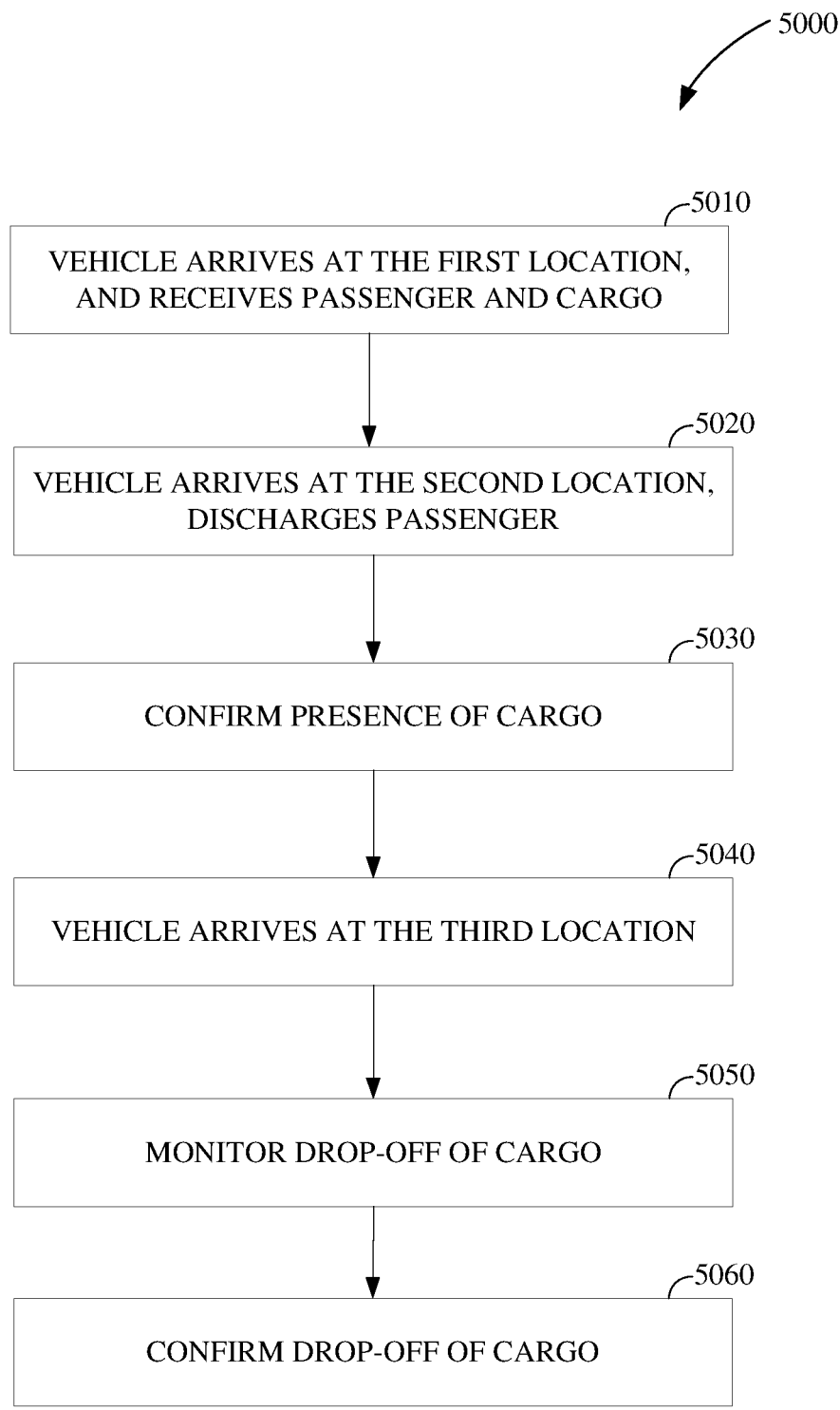
FIG. 5 is a flow chart diagram of a second variation in the method of FIG. 3.
Figure 6:
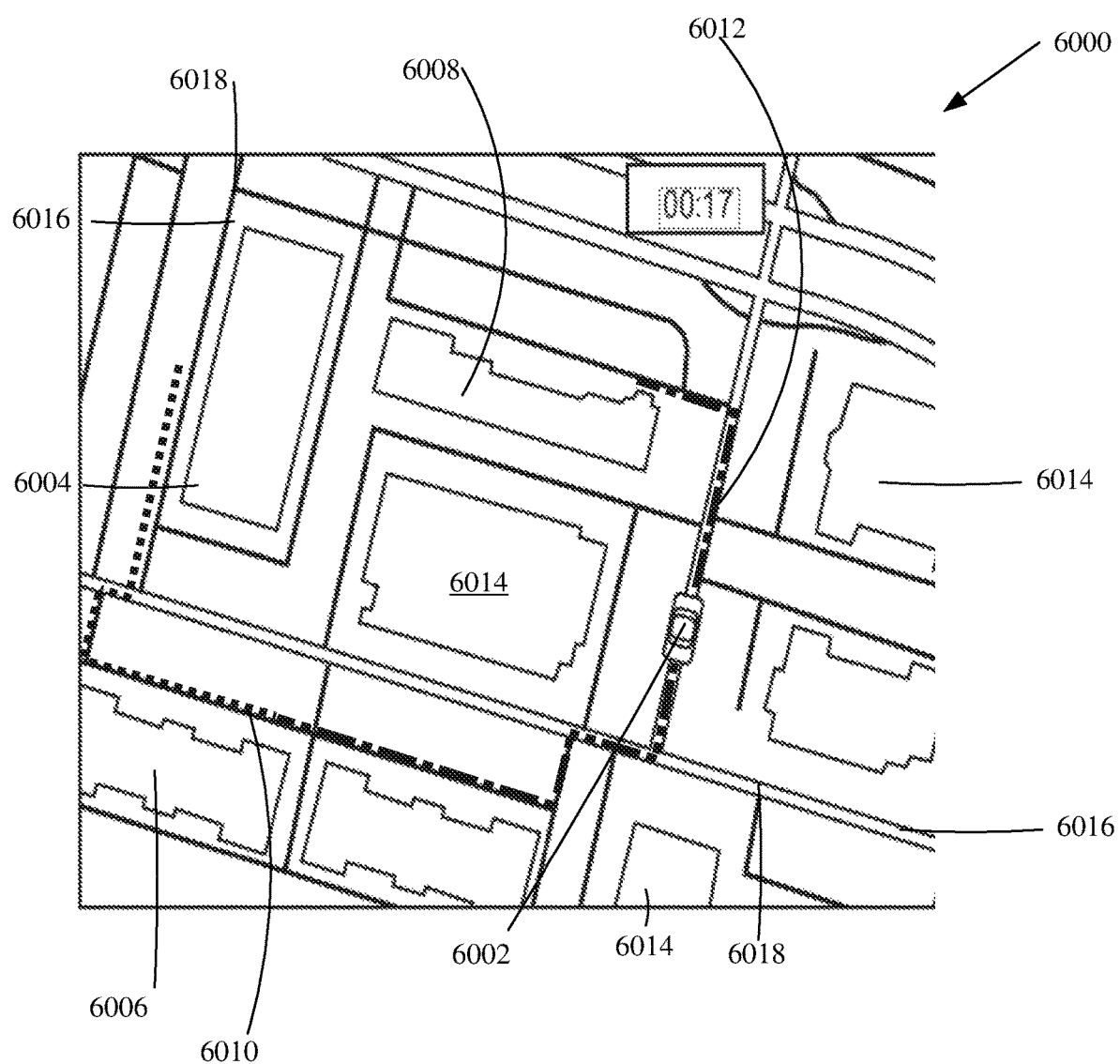
FIG. 6 is a diagram of a portion of a vehicle transportation network used to explain FIGS. 4 and 5.

FIG. 4 is a flow chart diagram of a first variation 4000 in the method of FIG. 3, and FIG. 5 is a flow chart diagram of a second variation 5000 in the method of FIG. 3. Each shows a sequence of operations to explain the validation process at operation 3030 in additional detail. FIG. 6 is a diagram of a portion of a vehicle transportation network 6000 used to explain FIGS. 4 and 5. Referring initially to FIG. 6, in each of FIGS. 4 and 5, an example is provided where the trip for a vehicle 6002 includes a first travel portion 6010 from a first location 6004 to a second location 6006, and a second travel portion 6012 from the second location 6006 to a third location 6008. As explained above, each of the first travel portion 6010 and the second travel portion 6012 is associated with a different service such that a first payload of the first travel portion 6010 is different from a second payload of the second travel portion 6012.

The vehicle transportation network 6000 as shown includes one or more unnavigable areas, such as buildings 6014, one or more partially navigable areas, such as parking areas, one or more navigable areas, such as roads 6016, or a combination thereof. An autonomous vehicle 6002, such as the autonomous vehicle 1000 shown in FIG. 1 or the autonomous vehicle 2100 shown in FIG. 2, traverses a portion or portions of the vehicle transportation network 6000.

The transportation network 6000 may include one or more interchanges 6018 between one or more navigable, or partially navigable, areas such as roads 6016. A portion of the transportation network 6000, such as a road 6016 may include one or more lanes, and may be associated with one or more directions of travel.

In some embodiments, a vehicle transportation network, or a portion thereof, such as the portion of the transportation network 6000 shown in FIG. 6, may be represented as vehicle transportation network information. For example, vehicle transportation network information may be expressed as a hierarchy of elements, such as markup language elements, that may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may include vehicle transportation network control information, such as direction of travel information, speed limit information, toll information, grade information, such as inclination or angle information, surface material information, aesthetic information, or a combination thereof.

The vehicle transportation network may be associated with, or may include, a pedestrian transportation network, such as a crosswalk, a walkway, or a sidewalk. A pedestrian transportation network, or a portion thereof, may be represented as pedestrian transportation network information. In some embodiments, the vehicle transportation network information may include pedestrian transportation network information. A pedestrian navigable area of the network may correspond with either a navigable or non-navigable area of a vehicle transportation network.

Referring initially to the first variation 4000 of FIG. 4, a request such as described with regard to operation 3010 is received before operation 4010. In this example, the request is received before commencement of the trip. For example, the request includes the first location 6004, an identification of the cargo to be picked up at the first location 6004, a time for pick-up of the cargo at the first location 6004, and the second location 6006. The request may also include an identification of a passenger to be picked up at the second location 6006. The vehicle, such as the vehicle 1000, subsequently traverses the route. Upon arrival of the vehicle at the first location at operation 4010, the validation process of operation 3030 may be performed.

In this example, the validation process includes monitoring or supervising the pick-up of the cargo at the first location 6004 using a communication device at operation 4020. The communication device may be coupled to a processor performing the method 3000 (e.g., wirelessly) for communicating with the source of the request. The communication device may include an audio link, a video link, or both an audio link and a video link. For example, the audio link may be one of the sensors 1360, such as a microphone, that receives audio input from an individual loading the cargo into the vehicle. The video link may be one of the sensors 1360, such as a video camera mounted to face the interior of the vehicle, such as in the trunk or at the rear view mirror. In this way, the presence of the cargo may be visually verified. A user interface, such as the UI 1350, may be used as the communication device for monitoring the pick-up.

For example, the UI 1350 may include the audio link or the video link, or both. The UI 1350 may be or include a contact screen that receives input from the individual loading the cargo into the vehicle, such as an indication that pick-up is complete.

The monitoring or supervising may include confirmation of the pick-up, or the validation process may separately confirm pick-up of the cargo at operation 4030 after monitoring or supervising the pick-up at operation 4020. Confirmation of the pick-up may include confirming the presence of the cargo within the first payload (e.g., within the vehicle) by communicating with the source of the cargo while the vehicle is at the first location 6004. The communicating may be done as described above with regards to operation 3040. For example, the processor 1330 may receive the signals from the UI 1350 or sensors 1360 obtained at operation 4020 and transmit the confirmation to the through the communication unit 1320 to the operations center 2400, which confirms addition of the cargo at the first location 6004 using a communication device.

Subsequently, the vehicle traverses the route from the first location 6004 to the second location 6006. At operation 4040, the vehicle arrives at the second location 6006. At the second location 6006, a passenger is received. In this example, the first payload comprises the cargo, and the second payload comprises the cargo and the passenger embarking the vehicle at the second location 6006. Thus, when the vehicle arrives at the third location 6008, the passenger and the cargo are discharged at operation 4050. That is, the passenger disembarks at the second location 6006 with the cargo.

In a variation, the cargo is removed at the second location 6006, and the passenger disembarks at the third location 6008. In this variation, the cargo forms the first payload, and the passenger forms the second payload.

Referring next to the second variation 5000 of FIG. 5, a request such as described with regard to operation 3010 is received before operation 5010. In this example, the request may be received in part or in whole before commencement of the trip. Where the request is received in part before commencement of the trip, the request may include the first location 6004, an identification of a passenger to be picked up at the first location 6004, and a time for pick-up of the passenger at the first location 6004. The time may sent as the time of the request. The first request may also include the second location 6006.

The vehicle, such as the vehicle 1000, subsequently traverses the route. Upon arrival of the vehicle at the first location 6004 at operation 5010, the passenger and cargo may be received. That is, the passenger embarks the vehicle with the cargo. The vehicle then travels from the first location 6004 to the second location 6006 with the first payload comprising the passenger and the cargo. At operation 5020, the vehicle discharges the passenger at the second location 6006. That is, the passenger disembarks, leaving the cargo.

The request may include an identification of the cargo and the third location 6008. Alternatively, the request received before commencement of the trip is a first request, and receiving the request includes receiving a second request after the pick-up of the passenger that includes the third location 6008. The request may be made by the passenger or another source before the vehicle arrives at the second location 6006, or at the time the vehicle arrives at the second location 6006.

Optionally, the validation process of operation 3030 is performed at the second location 6006. At operation 5030, the validation process may include confirming the presence of the cargo after the passenger disembarks at the second location 6006. This may be achieved using an audio device, a video device, a user interface, or any combination thereof as described previously. The presence as confirmed may be received by the operations center 2400, and the operations center 2400 uses its communication device to transmit a confirmation to a source of the request, if the source is other than the passenger for example.

The second payload is the cargo, and the vehicle traverse the route to transport the cargo from the second location 6006 to the third location 6008. The vehicle arrives at the third location 6008 for drop-off of the cargo at operation 5040. In this example, the validation process includes monitoring or supervising the drop-off of the cargo at the third location 6008 using a communication device at operation 5020. This may be performed using the same communication devices as described with regards to operation 4020. That is, the communication device that performs the monitoring may be coupled to a processor performing the method 3000 (e.g., wirelessly) for communicating with the source of the request. The communication device may include an audio link, a video link, or both an audio link and a video link. For example, the audio link may be one of the sensors 1360, such as a microphone, that receives audio input from an individual loading the cargo into the vehicle. The video link may be one of the sensors 1360, such as a video camera mounted to face the interior of the vehicle, such as in the trunk or at the rear view mirror. In this way, the removal of the cargo may be visually verified. A user interface, such as the UI 1350, may be used as the communication device for monitoring the drop-off. For example, the UI 1350 may include the audio link or the video link, or both. The UI 1350 may be or include a contact screen that receives input from the individual removing the cargo from the vehicle, such as an indication that drop-off is complete.

The monitoring or supervising may include confirmation of the drop-off, or the validation process may separately confirm drop-off of the cargo at operation 5060 after monitoring or supervising the drop-off at operation 5050. Confirmation of the drop-off may include confirming the absence of the cargo, and hence the removal of the second payload, by communicating with the source of the cargo while the vehicle is at the third location 6008. The communicating may be done as described above with regard to operation 3040. For example, the processor 1330 may receive the signals from the UI 1350 or sensors 1360 obtained at operation 5050, and transmit the confirmation to the through the communication unit 1320 to the operations center 2400, which confirms drop-off of the cargo at the third location 6008 using a communication device at the operations center 2400.

In a variation, the passenger is the first payload, instead of the passenger and the cargo. The passenger then loads the cargo into the vehicle at the second location 6006 while disembarking such that the second payload is the cargo.

In some implementations, the sequences and validation processes of FIGS. 4 and 5 may be combined by the inclusion of additional locations and payloads. For example, the trip may include a third travel portion from the third location 6008 to a fourth location, the third travel portion having a third payload different from the first payload of the first travel portion 6010 and the second payload of the second travel portion 6012. A first cargo item may form the first payload, a passenger and the first cargo item may form the second payload, and a second cargo item may form the third payload. A first cargo item and a passenger may form the first payload, the passenger may form the second payload, and a second cargo item may form the third payload. A first passenger may form the first payload, the first passenger and a first cargo item may form the second payload, and the first cargo item may form the third payload. A first passenger may form the first payload, a first cargo item may form the second payload, and a second passenger may form the third payload. Other combinations of payloads are possible.

Additional locations and hence additional combinations of passengers and cargo are possible.

The utility of autonomous vehicles may be increased by using a remote operation to extend the ride of a passenger or customer to include special services. The services may include delivery of cargo "pre-ride" or "post-ride". The use of the validation processes may allow guarantees regarding the handling of the cargo, such as its condition on pick-up and drop-off. Further, the teachings herein combines several needs of a customer, while saving time. The teachings also provide additional business opportunities to an owner of an autonomous vehicle.

As used herein, the terminology "passenger" or "customer" may be used interchangeably. As used herein, the terminology "processor", "controller" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for remote support of autonomous operation of a vehicle, the apparatus comprising:
    a processor that performs a method comprising:
    receiving a request for a trip through a transportation network, wherein the trip includes a first travel portion from a first location to a second location, and a second travel portion from the second location to a third location, each of the first travel portion and the second travel portion associated with a different service such that a first payload of the first travel portion is different from a second payload of the second travel portion;
    determining, based on the request, a route for the trip from the first location to the second location, and from the second location to the third location;
    performing a validation process that confirms a presence of cargo in only one of the first payload or the second payload; and
    notifying a source of the request of the presence of the cargo, wherein the source of the request is not included in either the first payload or the second payload.

2. The apparatus of claim 1, wherein performing the validation process comprises:
    confirming the presence of the cargo within the first payload or the second payload by communicating with a source of the cargo while the vehicle is at one of the first location or the second location.

3. The apparatus of claim 2, further comprising:
    a communication device coupled to the processor, wherein the communication device comprises an audio link, a video link, or both an audio link and a video link, communicating with the source of the cargo comprises communicating with the source of the cargo using the communication device.

4. The apparatus of claim 1, wherein the cargo is added to the vehicle by a passenger of the first payload that disembarks at the second location to form the second payload, and the method comprises:
    confirming, to a source of the cargo, delivery of the cargo while the vehicle is at the third location using a communication device coupled to the processor.

5. The apparatus of claim 1, wherein the cargo is a package that is added to the vehicle at the first location to form the first payload, and the method comprises:
    confirming, to a source of the package, addition of the package at the first location using a communication device coupled to the processor.

6. The apparatus of claim 5, wherein:
    the second payload comprises the cargo and a passenger embarking the vehicle at the second location.

7. The apparatus of claim 1, wherein:
    a passenger embarks at the first location and disembarks at the second location; and
    the request is received one of before commencement of the trip or after commencement of the trip and before reaching the second location.

8. The apparatus of claim 1, wherein:
    a passenger embarks at the second location and disembarks at the third location; and
    the request is received before commencement of the trip.

9. The apparatus of claim 1, wherein:
    only one of the first payload or the second payload includes a passenger.

10. The apparatus of claim 9, wherein the other of the first payload or the second payload includes the cargo.

11. The apparatus of claim 9, wherein only the second payload includes the cargo.

12. The apparatus of claim 1, further comprising:
    a memory storing instructions for performing the method, wherein the processor is configured to execute the instructions to perform the method.

13. An apparatus for remote support of autonomous operation of a vehicle, the apparatus comprising:
    a processor that performs a method comprising:
    receiving a request for a trip through a transportation network, wherein the trip includes a first travel portion from a first location to a second location, and a second travel portion from the second location to a third location, each of the first travel portion and the second travel portion associated with a different service such that a first payload of the first travel portion is different from a second payload of the second travel portion;
    determining, based on the request, a route for the trip from the first location to the second location, and from the second location to the third location;
    performing a validation process that confirms a presence of an object within the vehicle in at least one of the first payload or the second payload; and
    notifying a source of the request of the presence of the object within the vehicle, wherein a passenger is present during only one of the first travel portion or the second travel portion concurrently with the object, and the passenger is not the source of the request.

14. A method for remote support of autonomous operation of a vehicle, the method comprising:
    receiving a request for a trip through a transportation network, wherein the trip includes a first travel portion from a first location to a second location, and a second travel portion from the second location to a third location, each of the first travel portion and the second travel portion associated with a different service such that a first payload of the first travel portion is different from a second payload of the second travel portion;

determining, based on the request, a route for the trip from the first location to the second location, and from the second location to the third location; and performing a validation process that confirms a presence of an object in at least one of the first payload or the second payload, wherein performing the validation process comprises at least one of:

supervising, using a communication device, a pick-up of the object, including identifying a presence of the object within the vehicle at a pick-up location, and notifying a source of the request of the pick-up of the object, wherein the source of the request is not present at the pick-up location; or supervising, using the communication device, a drop off of the object, including identifying a presence of the object within the vehicle at a drop off location, and notifying the source of the request of the drop off of the object, wherein the source of the request is not present at the drop off location.

15. The method of claim 14, wherein:

receiving the request comprises receiving the request before commencement of the trip, the request comprising:
the first location;
an identification of cargo to be picked up at the first location, wherein the object includes the cargo;
a time for pick-up of the cargo at the first location;
the second location; and
an identification of a passenger to be picked up at the second location; and performing the validation process comprises:
supervising the pick-up of the cargo at the first location using the communication device, the cargo forming the first payload, and the cargo and the passenger forming the second payload; and
notifying the source of the request of the pick-up of the cargo at the first location.

16. The method of claim 14, wherein:

receiving the request comprises receiving a first request before commencement of the trip, the first request comprising:
the first location;
an identification of a passenger to be picked up at the first location;
a time for pick-up of the passenger at the first location; and
the second location; and performing the validation process comprises:
supervising drop off of cargo at the third location using the communication device, the cargo forming the second payload, and the passenger or both the passenger and the cargo forming the first payload; and
notifying the source of the request of the drop off of the cargo at the third location, wherein the object includes the cargo.

17. The method of claim 16, wherein the request comprises:
an identification of the cargo; and
the third location.

18. The method of claim 16, wherein:

receiving the request comprises receiving a second request after the pick-up of the passenger, the second request including the third location, and performing the validation process comprises confirming the presence of the cargo at the second location.

19. The method of claim 14, wherein:

the trip includes a third travel portion from the third location to a fourth location, the third travel portion having a third payload different from the first payload of the first travel portion and the second payload of the second travel portion.

20. The method of claim 19, wherein:

a first package forms the first payload, a passenger and the first package form the second payload, and a second package forms the third payload.

* * * * *